United States Patent [19]
Diaz et al.

[11] Patent Number: 5,754,786
[45] Date of Patent: May 19, 1998

[54] SYSTEM AND METHOD FOR INTEGRATED OVERLOAD CONTROL AND MESSAGE DISTRIBUTION

[75] Inventors: Alvaro H. Diaz, Holmdel; Rodolfo Alberto Milito, Piscataway, both of N.J.

[73] Assignee: AT&T Corp, Middletown, N.J.

[21] Appl. No.: 713,565

[22] Filed: Sep. 13, 1996

[51] Int. Cl.$^6$ .................................................. G06F 15/16
[52] U.S. Cl. .............................. 395/200.53; 395/675
[58] Field of Search ........................ 395/200.53, 675; 379/112, 309

[56] References Cited

U.S. PATENT DOCUMENTS 5,479,407 12/1995 Ko et al. ...................................... 320/231
5,655,120 8/1997 Witte et al. .................................. 395/675

OTHER PUBLICATIONS

"Dynamic Network Call Distribution With Periodic Updates", Authors: Levy, Durinovic–Johri, Milito, ITC 14, 1994 Elseview Science B.V., pp. 85–94.

Primary Examiner—William M. Treat
Attorney, Agent, or Firm—Alfred G. Steinmetz

[57] ABSTRACT

A message distribution system having multiple message processors provides integrated overload control and message distribution. An additional "dummy" message processor is established by the system, to which a certain fraction of messages is assigned as though it were a real processor, thereby accomplishing rejection of that fraction of messages. The fraction to be rejected is determined in real time based on the states of the various processors, which also is the basis for the allocation among the processors of those messages that are not rejected.

29 Claims, 2 Drawing Sheets

SYSTEM AND METHOD FOR INTEGRATED OVERLOAD CONTROL AND MESSAGE DISTRIBUTION

BACKGROUND OF THE INVENTION

This invention relates to an integrated overload control and message distribution system and method in a distributed processing system. In particular, this invention relates to a system and method to account for overload conditions and to dynamically adjust the rejection rate of new arrivals in reaction to such conditions.

A distributed message processing system as discussed herein may be any type of system having multiple processors each of which handle messages—e.g., packets—which may, for example, be data to be processed or communications to be forwarded or routed. In such a system, messages may be delivered to the various message processors by one or more distribution nodes which receive the messages from user inputs.

In order for such a system to operate effectively, and at an acceptable level from a user point of view, messages must be distributed by the distribution nodes to the message processors in a way that evens the load among the various message processors. Even if the aggregate load on the system is below its capacity, one or more message processors may be overloaded. A call distribution scheme should attempt to minimize the probability of such occurrences. And if the overall level of activity in the system exceeds the total system capacity, then regardless of the distribution of messages among the various message processors, some incoming messages may have to be rejected completely to prevent system degradation or failure. An overload control scheme should avoid such degradation or failure by rejecting at any particular time the fraction of message arrivals that the system cannot handle at that time.

If the message interarrival time, as well as the message service times, are deterministic, a distribution scheme which assigns messages in equal proportion to each message processor by using a "round-robin" sequence is acceptable. However, if messages arrive randomly, or require different and unpredictable amounts of time to be processed, a more complex adaptive system may be required.

For example, in a switched telephone network, calls arrive at random times as subscribers initiate them. Each call arrives at one of a plurality of distribution nodes, or "signal interface processors" ("SIPs"), and is distributed by that SIP to one of the message processors, or "call processors" ("CPs"). The CP communicates with the system controller, or "fabric controller" ("FC"), which is responsible for assigning a trunk to the call. During the process of handling a call, the FC may require the services of a CP on more than one occasion. Specifically, during various phases of the call, the FC may communicate with the CP to set up the call, or to release the various resources used by the call after it is completed. In at least one known system, each time the FC needs a CP to service a particular call, the same CP is used throughout the call. Therefore, because telephone calls can have random durations depending on the whims of the subscribers, a particular CP may be called upon at irregular times to service more than one existing call while new calls are still arriving.

Moreover, at any given instant, one CP may, by random chance, be assigned to deal with a number of long duration calls, and so have a large number of calls for which it is responsible, while another CP may have previously been assigned a number of calls that had short durations and have now terminated, so that that other CP may have only a very small number of remaining calls for which it is responsible. If calls are assigned to CPs purely on a round-robin basis, and the next call to arrive is assigned to the very busy CP, that CP may fail, or its performance may become so degraded that it is unacceptable to subscribers, while the other, less busy, CP could have handled the call with ease.

In addition, if the system as a whole is very busy, call processing may degrade to the point that subscribers encounter unacceptable delays in processing calls. This can lead to further system degradation, because if a subscriber initiates a call, but the system is slow in setting up the call, the subscriber may hang up and try again, even though the system has already allocated resources to the first attempt. The system will then have to handle the new attempt while it is still deallocating the resources from the first attempt. This worsens the system overload condition. In such a situation, the system would perform better overall if the subscriber's original attempt to place a call had simply been rejected outright. Then there would have been no resources allocated to that attempt, nor to any subsequent attempt until the system utilization level had fallen to the point where the call could be handled.

Methods are known to distribute messages to message processors according to their ability to handle them. Similarly, methods are known to "throttle," or reject, messages that exceed the system capacity. However, such known methods are complex and operate independently.

It would be desirable to be able to provide a method for integrating overload control—i.e., the rejection of messages by the system—with the distribution of messages among message processors, as well as to provide a system utilizing such a method.

It would further be desirable to be able to provide such a method that operates in a simple and efficient manner, as well as a system utilizing such a method.

SUMMARY OF THE INVENTION

It is an object of this invention to provide a method for integrating overload control—i.e., the rejection of messages by the system—with the distribution of messages among message processors, as well as to provide a system utilizing such a method.

It is a further object of this invention to provide such a method that operates in a simple and efficient manner, as well as a system utilizing such a method.

In accordance with this invention, there is provided a method for distributing messages among message processors in a system having a plurality of message processors and at least one distribution node for receiving messages and distributing the messages to the message processors, wherein different ones of the messages occupy respective ones of the message processors for different durations. The method comprises providing a virtual message processor in addition to the plurality of message processors, whereby messages arriving at the virtual message processor are denied processing by the system. Operation of the system is monitored to determine a respective level of activity for each of the message processors and for the system. From the respective levels of activity a desired distribution of messages among the message processors and the virtual message processor is calculated. Messages are distributed from the distribution node to the message processors and the virtual message processor in accordance with the calculated desired distribution.

A system incorporating such a method is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
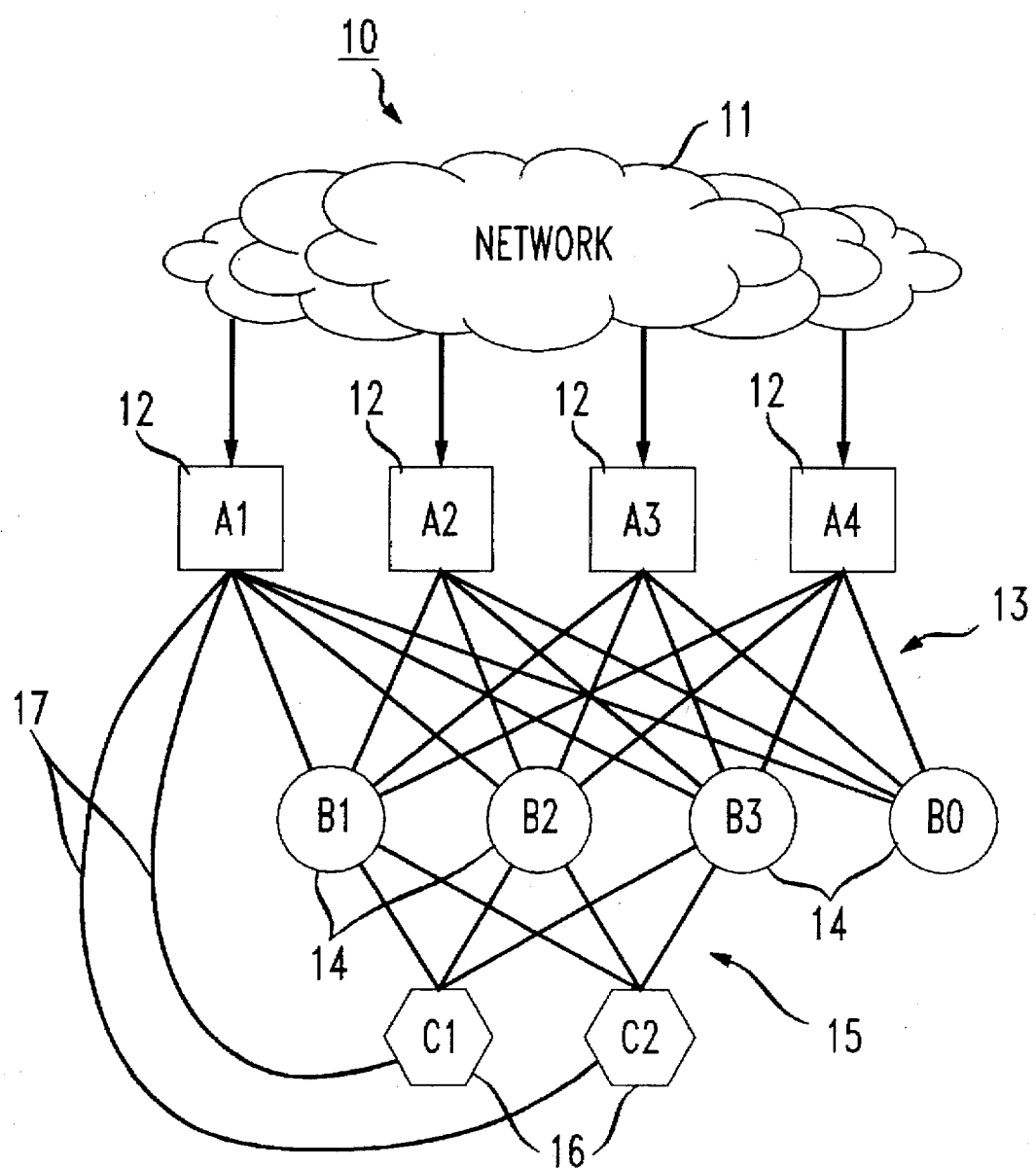
FIG. 1 is a schematic block diagram of a preferred embodiment of a system according to the present invention.

As stated above, the present invention can be used with any type of data processing system in which messages (i.e., data to be processed or communications to be routed) arrive at a distribution node and must be distributed among a plurality of processors, each of which remains responsible for any message sent to it until that message leaves the system. In the discussion that follows, the invention will be described in the context of a telephone switching system. However, such discussion is not intended to limit the present invention to such a system.

The system and method according to the present invention handles system overload by creating, preferably in software, an additional call processor in the system. That additional call processor is a "dummy" processor, in that it does not really exist and it processes no calls. Instead, it is used by the system as a mechanism to reject calls. Specifically, the system assigns calls arriving at a distribution node among the various call processors in accordance with their availability, which is determined by measuring system activity. When the measure of system activity indicates that a certain fraction of incoming calls should be rejected to prevent system degradation, the system assigns that fraction as the fraction of all calls to be handled by the "dummy" processor. When calls arrive at a distribution node, the distribution node assigns calls to the various call processors, including the "dummy" processor, in accordance with the fraction assigned to that processor. As far as the distribution node is concerned, the "dummy" processor is just another processor to be assigned calls. The distribution and allocation of calls and the control of system overload is integrated in the system and method of the invention, and thus operates efficiently.

The determination of the fractions of incoming calls to be assigned to each call processor, including the "dummy" processor, may be handled by a separate monitoring processor that monitors the condition of the various processors, as well as the fabric controller or controllers, to determine whether or not the system is overload and thus to determine a rejection percentage, and also to determine a level of activity for each processor to determine the fraction of accepted calls to assign to each processor. However, it is preferred that instead of a separate monitoring processor, the distribution node itself handle the monitoring function. Thus, in the preferred embodiment, the distribution node would query the various system components to determine their condition and level of activity at a regular interval $\Delta t$. At each interval $\Delta t$, then, the system would determine a rejection rate $\beta$ for the system, as well as a set of fractions representing the allocations for the various call processors, to be used during that interval until the next measurement is taken. The allocations and rejection rate would thus be updated every $\Delta t$, so that they remain current.

In fact, the preferred embodiment of the system is likely to have a plurality of distribution nodes or SIPs. In such a case, it is preferred that each SIP take its own measurements. Preferably, each SIP would take its measurements at intervals $\Delta t$, but the various SIPs would not take the measurements at the same time. Instead, the SIPs would preferably take the measurements at staggered intervals. Most preferably, the intervals would be evenly staggered. For example, if there are n SIPs, then each SIP would take its measurements of system conditions at an interval $\Delta T$ after the previous SIP took measurements, where $\Delta T=(\Delta t)/n$. However, the intervals could be staggered unevenly, and could even be asynchronous, so that different SIPs might on rare occasions take measurements at the same time. In any case, the result is that, except possibly on the rare occasions just described, each SIP preferably would be using a different set of allocations and a different system rejection rate $\beta$.

A first level of performance enhancement would be achieved if the rejection rate $\beta$ were used to route a certain fraction of calls to the "dummy" processor for rejection, even if the remaining calls were distributed evenly—e.g., on a round-robin basis—among the various CPs. However, even better results would be obtained by adjusting the allocations as well.

The calculation of $\beta$ and of the allocations among the CPs will be described in more detail below. However, $\beta$ is generally proportional to the fraction by which the number of calls are arriving at SIPs from the network exceeds the maximum capacity of the system. Similarly, the allocations among the various CPs will generally be either inversely proportional to the number of calls being handled by each CP, or inversely proportional to the utilization rate of each CP (i.e., proportional to the idle time of each CP). However, other schemes for calculating the allocations, and the system rejection rate $\beta$, may be used.

FIG. 1 shows a schematic representation of a preferred embodiment of a system 10 according to the present invention. System 10 includes the public telephone network 11 to which are connected a plurality SIPs 12 designated $A_M$ (in the system as shown, $M=1, \ldots, 4$). Each SIP 12 may be essentially the same as a known SIP, enhanced to the extent necessary to carry out the monitoring function and calculation of distributions or allocations of calls and the system rejection rate.

None of SIPs 12 connects to any other of SIPs 12. However, each SIP 12 is connected by connections 13 to every one of CPs 14, which may be essentially the same as known CPs, and which are designated $B_N$ (in the system as shown, $N=0, \ldots, 3$), where $B_0$ represents the "dummy" CP. Similarly, none of CPs 14 connects to any other of CPs 14, but each CP 14 is connected by connections 15 to every one of FCs 16, and which are designated $C_K$ (in the system as shown, $K=1,2$). Connections 13, 15 are similar to those in known systems, except that connections 13 are used not only for routing messages, but also for monitoring of CPs 14 by SIPs 12. In addition, each SIP 12 is connection by connections 17 (shown for SIP $A_1$ only to limit confusion in FIG. 1) to each FC 16, to allow SIPs 12 to monitor the conditions of FCs 16.

The invention builds on a distribution method described in proposed in Y. Levy, S. Durinovic-Johri, and R. A. Milito, "Dynamic Network Call Distribution with Periodic Updates," *Proc. of the 14th ITC*, Antibes, France, June 1994, which is hereby incorporated by reference in its entirety, enhanced by the addition of CP $B_0$ to provide effective overload control in addition to its original call routing functionality. The discussion that follows will consider an architecture with K=1—i.e., having a single FC. Each SIP 12 is equipped with N+1 variables $\{q_i\}$, one per CP 14, plus an extra one to account for rejections (the "dummy" CP, denoted $B_0$, with associated variable $q_0$). All variables are initialized to zero. At every arrival of a call the method allocates fractions that sum to one, and subtracts one unit from the variable corresponding to the site to which the arriving call is assigned. The variables can be regarded as banks, and their values as credit. An arriving call is routed to the CP 14 whose associated bank holds the largest credit. Hence, the routing decision aims to balance the credits across the banks. The sum of credit in the banks is kept constant through time, because a unit of credit is both distributed and withdrawn at every arrival. Furthermore, since all banks are initialized to zero, at any epoch at least one bank has positive credit (unless all banks are exactly at zero).

Suppose that the fraction of credit assigned to each bank at every arrival epoch is proportional to the available capacity of its corresponding CP 14 (in the case of the CP $B_0$, the "capacity" represents the needed rate of rejections in order to keep delays below targeted values). If the fractions of credit were equal, and constant over time, the routing to the N+1 sites would be a round-robin sequence. A round-robin sequence allocates the same fraction of arrivals to each destination in the most regular way. In fact, each CP 14 receives a call every N+1 arrivals. In the case of constant but unequal fractions, the routing rule allocates the traffic to the CPs 14 according to these fractions, and does so in a regular way.

Those unequal fractions (which may be equal by chance), are preferably determined as follows:

Let $a_n$ denote the CP 14 to which the nth call arrival is routed. Routing decision $a_n=i$, for $i \neq 0$ implies that the nth arrival is routed to CP $B_i$ and $a_n=0$ implies that the nth arrival is rejected.

Rejections are determined as follows:

Every T seconds each SIP 12 receives a message from the FC 16 as well as each CP 14 reporting their current utilization levels.

Let $\rho_l^{Cmeas}$ and $\rho_l^{Bi}$ denote, respectively, the utilization of FC 16 and CP $B_i$ at epoch l. It is known that processor utilization measured over relatively small intervals may vary widely. It is preferable to filter out the swings, while retaining information about the trend. Any suitable technique may be used, such as exponential smoothing, as follows:

Each SIP 12 selects $0<\alpha<1$ and implements the following recursions:

$$\rho_l^C = \alpha \rho_{l-1}^C + (1-\alpha)\rho_l^{Cmeas} \quad (1)$$

and $$\rho_l^B = \alpha \rho_{l-1}^B + ((1-\alpha)/N) \sum_{i=1}^{N} \rho_l^{Bi} \quad (2)$$

It is desirable to prevent FC 16 and CPs 14 from exceeding over long periods given target utilizations $\rho_{tar}^C$ and $\rho_{tar}^B$ respectively. To achieve this goal, the fraction of rejected calls during the lth period, called $\beta_l$ is adjusted according to a recursion that can be expressed in terms of fraction of admitted calls:

$$1-\beta_l = \min(1, (1-\beta_{l-1})\min((\rho_{tar}^C/\rho_l^C), (\rho_{tar}^B/\rho_l^B))) \quad (3)$$

Preferably, the fraction of accepted calls is increased whenever the (smoothed) utilizations of the FC 16 and the CPs 14 are below their targets, and is decreased at least one of them is above its target.

Each SIP 12 preferably acts autonomously. The system, however, is preferably initialized so that the measurements received by different SIPs 12 from the CPs 14 and the FC 16 are staggered. Hence, the call rejection measurement function preferably is activated about every T/M sec.

Call routing is determined as follows:

Each SIP 12 preferably keeps a set of N+1 variables $\{q_i\}$. The variable $q_0$ is associated with rejections, and each one of the other N variables relates to a specific CP 14. $\beta_n$ refers to the fraction of job rejections at the time of the nth arrival epoch. Similarly, $\rho_n^{Bi}$ indicates the utilization of CP $B_i$ at the nth arrival epoch.

The q-variables are initialized at zero, and updated at each arrival as follows:

$$a_n = \text{argmax}\{q_i(n-1)\} \quad (4)$$

$$q_0(n) = q_0(n-1) + \beta_n, \text{ for } a_n \neq 0 \quad (5a)$$

$$q_0(n) = q_0(n-1) + \beta_n - 1, \text{ for } a_n = 0 \quad (5b)$$

$$q_i(n) = q_i(n-1) + (1-\beta_n)\left((1/\rho_n^{Bi})/\sum_{j=1}^{N}(1/\rho_n^{Bj})\right), \quad (6a)$$

for $a_n \neq i > 0$ $$q_i(n) = q_i(n-1) + (1-\beta_n)\left((1/\rho_n^{Bi})/\sum_{j=1}^{N}(1/\rho_n^{Bj})\right) - 1, \quad (6b)$$

for $a_n = i > 0$

In an alternative embodiment, rejections are determined as shown above, but all call arrivals that are not rejected are distributed evenly among the CPs 14. When the rejection rate is zero, this collapses to a round-robin distribution. The distribution can be described mathematically as follows:

$$a_n = \text{argmax}\{q_i(n-1)\}$$

$$q_0(n) = q_0(n-1) + \beta_n, \text{ for } a_n \neq 0$$

$$q_0(n) = q_0(n-1) + \beta_n - 1, \text{ for } a_n = 0$$

$$q_i(n) = q_i(n-1) + (1-\beta_n)/N, \text{ for } a_n \neq i > 0$$

$$q_i(n) = q_i(n-1) + (1-\beta_n)/N - 1, \text{ for } a_n = i > 0$$

The equations set forth above are based on utilizations $\rho$. It is also possible to base the equations on queue lengths $\{L^{Bj}\}$ (the numbers of calls for which a CP 14 is responsible). In such a case, exponential smoothing is as follows:

$$L_n^{Bj} = \alpha L_{n-1}^{Bj} + (1-\alpha)L_n^{Bj \, (meas)}$$

and the allocation fractions are:

$$q_i(n) = q_i(n-1) + (1-\beta_n)\left((1/e^u)/\sum_{j=1}^{N}(1/e^u)\right),$$

for $a_n \neq i > 0$, where $u = L_n^{Bi}$ $$q_i(n) = q_i(n-1) + (1-\beta_n)\left((1/e^u)/\sum_{j=1}^{N}(1/e^u)\right) - 1,$$

for $a_n = i > 0$, where $u = L_n^{Bi}$

Figure 2:
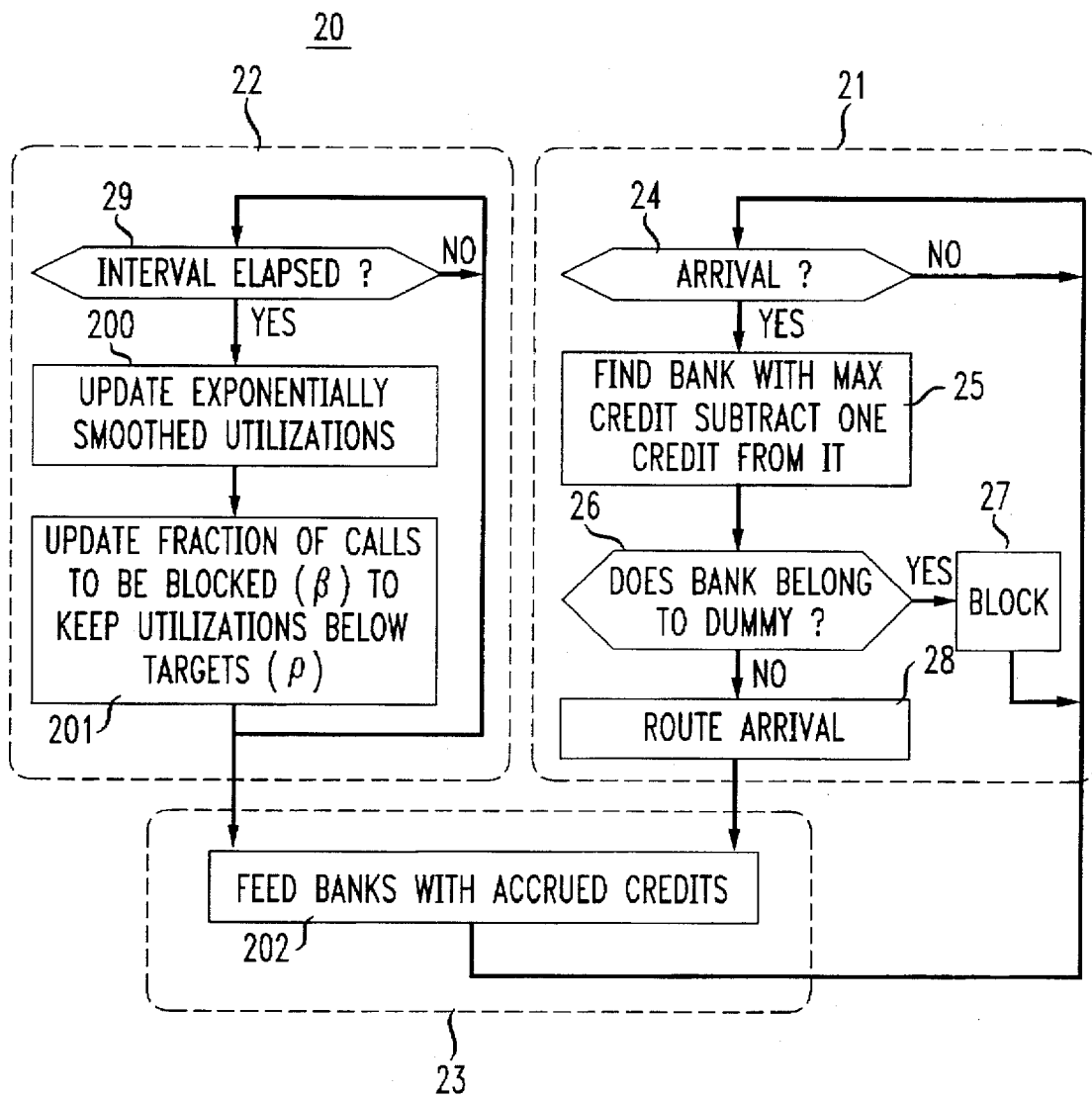
FIG. 2 is a flow diagram showing the operation of a preferred embodiment of a system and method according to the present invention.

FIG. 2 is a flow diagram showing the operation of a preferred embodiment of the method according to the invention. Method 20 includes call distribution scheme 21, overload control scheme 22 and integration function 23.

Call distribution scheme 21 starts at test 24, where the system continues to check for an arriving call until one is received. When a call is received, the system moves to step 25, where it finds the bank with the maximum credit (as determined by Eq. 4, see above), and subtracts one credit from it. Next, at test 26, the system checks to see whether or not it has selected the bank associated with "dummy" $CPB_0$. If so, then at step 27, the call is blocked and the system returns to test 24 to await another arriving call. Otherwise, the call is routed at step 28 to one of CPs 14, and the system returns to test 24 to await another arriving call, and also updates the credits in the banks at step 202, using the current values of $q_i$, to prepare for the next arrival.

Overload control scheme 22 begins at test 29 where the system waits until the measurement interval has passed. When the measurement interval has passed, then at step 200, the system smooths the utilization data, preferably by exponential smoothing as discussed above (Eqs. 1–2). Next, at step 201, the system uses the utilization data to update the rejection fraction $\beta$ (see Eq. 3).

The integration of call distribution scheme 21 and overload control scheme 22 occurs in integration function 23, where at step 202, the system computes the fractions to be added to each bank before the next call arrival (see Eqs. 5a, 5b, 6a, 6b). This computation, the result of which is used in call distribution scheme 21, is affected by the value of $\beta$, which is derived from overload control scheme 22.

Thus it is seen that a method for integrating the distribution of messages among message processors as well as the rejection of messages by the system, as well as a system utilizing such a method, has been provided. One skilled in the art will appreciate that the present invention can be practiced by other than the described embodiments, which are presented for purposes of illustration rather than of limitation, and the present invention is limited only by the claims which follow.

What is claimed is:

1. A method for controlling overload and distributing messages among message processors in a system, said system having a plurality of message processors and at least one distribution node for receiving messages and distributing said messages to said message processors, wherein different ones of said messages occupy respective ones of said message processors for different durations, said method comprising the steps of:

providing a virtual message processor in addition to said plurality of message processors, whereby messages arriving at said virtual message processor are denied processing by said system;

monitoring operation of said system to determine a respective level of activity for each of said message processors and for said system;

calculating from said respective levels of activity a desired distribution of messages among said message processors and said virtual message processor; and distributing messages from said distribution node to said message processors and said virtual message processor in accordance with said calculated desired distribution.

2. The method of claim 1 wherein:

said monitoring and calculating steps occur at regular intervals; and said calculated desired distribution is used in said distributing step between said regular intervals.

3. The method of claim 2 wherein said monitoring and calculating steps are performed by said at least one distribution node.

4. The method of claim 3 wherein:

when said system comprises a plurality of said distribution nodes, said monitoring and calculating steps are performed independently by each of said distribution nodes; and each of said distribution nodes distributes said messages to said message processors in accordance with a respective independently calculated desired distribution.

5. The method of claim 4 wherein said regular intervals are identical for all of said distribution nodes.

6. The method of claim 5 wherein said regular intervals occur at staggered times among said distribution nodes.

7. The method of claim 4 wherein said regular intervals are different for different ones of said distribution nodes.

8. The method of claim 2 further comprising establishing a respective credit bank corresponding to each said message processor and said virtual message processor; wherein:

said monitoring and calculating steps comprise:

whenever a message arrives at a distribution node, deriving from said desired distribution a respective fractional credit to be deposited in each respective credit bank, said respective fractional credits summing to one credit unit; and said distributing step comprises:

identifying one of said credit banks having a higher credit balance than any other one of said credit banks, distributing said message to one of said message processors corresponding to said one of said banks having said higher credit balance, and subtracting a unit of credit from said one of said banks having said higher credit balance.

9. The method of claim 1 wherein:

when said system comprises a plurality of said distribution nodes, said monitoring and calculating steps are performed independently by each of said distribution nodes; and each of said distribution nodes distributes said messages to said message processors in accordance with a respective independently calculated desired distribution.

10. The method of claim 1 wherein, when said system comprises at least one system processor associated with said message processors, said monitoring step comprises monitoring activity of said at least one system processor as part of said level of activity for said system.

11. The method of claim 1 wherein said calculating step comprises calculating a desired distribution in which a fraction of arriving messages is directed to said virtual message processor, and all messages not directed to said virtual message processor are distributed uniformly among said message processors.

12. The method of claim 1 wherein said calculating step comprises calculating a desired distribution in which a fraction of arriving messages is directed to said virtual message processor, and all messages not directed to said virtual message processor are distributed among said message processors according to said levels of activity of said message processors.

13. The method of claim 12 wherein:

said monitoring step comprises determining said levels of activity as a function of number of messages being serviced by each of said message processors; and said calculating step comprises calculating a desired distribution in which a fraction of arriving messages is directed to said virtual message processor, and all messages not directed to said virtual message processor are distributed among said message processors in inverse proportion to said numbers of messages being serviced by each of said message processors.

14. The method of claim 12 wherein:

said monitoring step comprises determining said levels of activity as a function of utilization of each of said message processors; and said calculating step comprises calculating a desired distribution in which a fraction of arriving messages is directed to said virtual message processor, and all messages not directed to said virtual message processor are distributed among said message processors in inverse proportion to said utilization of each of said message processors.

15. A message processing system comprising:
a plurality of message processors;
at least one distribution node for receiving messages and distributing said messages to said message processors, wherein different ones of said messages occupy respective ones of said message processors for different durations;
a virtual message processor in addition to said plurality of message processors, whereby messages arriving at said virtual message processor are denied processing by said system;
a monitor of said system to determine a respective level of activity for each of said message processors and for said system; and
a distribution calculator for calculating from said respective levels of activity a desired distribution of messages among said message processors and said virtual message processor; wherein:
messages are distributed from said distribution node to said message processors and said virtual message processor in accordance with said calculated desired distribution.

16. The system of claim 15 wherein:
said monitor and said distribution calculator operate at regular intervals; and
said calculated desired distribution is used to distribute said messages between said regular intervals.

17. The system of claim 16 wherein each said at least one distribution node functions as said monitor and said distribution calculator.

18. The system of claim 17 comprising a plurality of said distribution nodes; wherein:
each of said distribution nodes operates independently as said monitor and said distribution calculator; and
each of said distribution nodes distributes said messages to said message processors in accordance with a respective independently calculated desired distribution.

19. The system of claim 18 wherein said regular intervals are identical for all of said distribution nodes.

20. The system of claim 19 wherein said regular intervals occur at staggered times among said distribution nodes.

21. The system of claim 18 wherein said regular intervals are different for different ones of said distribution nodes.

22. The system of claim 16 further comprising a respective credit bank corresponding to each said message processor and said virtual message processor; wherein:
whenever a message arrives at a distribution node, said distribution calculator derives from said desired distribution a respective fractional credit to be deposited in each respective credit bank, said respective fractional credits summing to one credit unit; and
messages are distributed from said distribution node to one of said message processors and said virtual message processor by:
identifying one of said credit banks having a higher credit balance than any other one of said credit banks,
distributing said message to one of said message processors corresponding to said one of said banks having said higher credit balance, and
subtracting a unit of credit from said one of said banks having said higher credit balance.

23. The system of claim 15 comprising a plurality of said distribution nodes; wherein:
each of said distribution nodes operates independently as said monitor and said distribution calculator; and
each of said distribution nodes distributes said messages to said message processors in accordance with a respective independently calculated desired distribution.

24. The system of claim 15 further comprising at least one system processor associated with said message processors; wherein:
said monitor monitors activity of said at least one system processor as part of said level of activity for said system.

25. The system of claim 15 wherein said distribution calculator calculates a desired distribution in which a fraction of arriving messages is directed to said virtual message processor, and all messages not directed to said virtual message processor are distributed uniformly among said message processors.

26. The system of claim 15 wherein said distribution calculator calculates a desired distribution in which a fraction of arriving messages is directed to said virtual message processor, and all messages not directed to said virtual message processor are distributed among said message processors according to said levels of activity of said message processors.

27. The system of claim 26 wherein:
said monitor determines said levels of activity as a function of number of messages being serviced by each of said message processors; and
said distribution calculator calculates a desired distribution in which a fraction of arriving messages is directed to said virtual message processor, and all messages not directed to said virtual message processor are distributed among said message processors in inverse proportion to said numbers of messages being serviced by each of said message processors.

28. The system of claim 26 wherein:
said monitor determines said levels of activity as a function of utilization of each of said message processors; and
said distribution calculator calculates a desired distribution in which a fraction of arriving messages is directed to said virtual message processor, and all messages not directed to said virtual message processor are distributed among said message processors in inverse proportion to said utilization of each of said message processors.

29. A method for controlling overload in a distributed message processing system, said system having a plurality of at least one type of processor, one of said at least one type being message processor, wherein each message to be processed is routed to one of said message processors as said message arrives, said method being for maintaining performance targets for said system, said method comprising the steps of:
measuring, at regular intervals, performance of processors in said system to obtain performance measurements;
filtering said performance measurements to minimize random fluctuations in performance to obtain consistent filtered performance values;
establishing a respective bank for each respective message processor, and a virtual bank for determining a rate of rejection of arriving messages;

adjusting a throttling parameter in response to said filtered performance values, said throttling parameter functioning as credit to said virtual bank for determining a rate of rejection of arriving messages;

as each said message arrives, allocating credits to each said respective bank, other than said virtual bank, in inverse proportion to at least one of (a) utilization, (b) buffer occupancy, and (c) delay, of said respective message processor;

as each said message arrives, finding that one of said respective banks and virtual bank having a maximum credit, and routing said arriving message to said respective message processor when said one of said respective banks and virtual bank having a maximum credit is one of said banks, and rejecting said message when said one of said respective banks and virtual bank having a maximum credit is said virtual bank; and subtracting a unit of credit from said one of said respective banks and virtual bank upon said routing or rejection.

* * * * *